US008840157B2

(12) United States Patent
Dempsey et al.

(10) Patent No.: US 8,840,157 B2
(45) Date of Patent: Sep. 23, 2014

(54) TERMINAL END MOUNTED PROSTHETIC DEVICE

(75) Inventors: Gabriella J. Dempsey, Ames, IA (US); Kate Murray, Ames, IA (US); Mackenzie Grewell, Ames, IA (US); Zoe Groat, Ames, IA (US); Courtney Pohlen, Gilbert, IA (US); Maria Werner Anderson, Ames, IA (US)

(73) Assignee: Flying Monkey's Foundation, West Des Moines, IA (US)

( * ) Notice: Subject to any disclaimer, the term of this patent is extended or adjusted under 35 U.S.C. 154(b) by 0 days.

(21) Appl. No.: 13/369,047

(22) Filed: Feb. 8, 2012

(65) Prior Publication Data

US 2012/0212003 A1 Aug. 23, 2012

Related U.S. Application Data

(60) Provisional application No. 61/444,406, filed on Feb. 18, 2011.

(51) Int. Cl.

| | |
|---|---|
| ***B65G 7/12*** | (2006.01) |
| ***B43L 15/00*** | (2006.01) |
| ***A47G 21/08*** | (2006.01) |
| ***A46B 5/02*** | (2006.01) |
| ***B43K 23/004*** | (2006.01) |

(52) U.S. Cl.

CPC ............... *B43K 23/004* (2013.01); *B43L 15/00* (2013.01); *A47G 21/08* (2013.01); *A46B 5/025* (2013.01); *A46B 2200/1066* (2013.01)

USPC .................................................. 294/25; 401/8

(58) Field of Classification Search

USPC ......... 294/24–25; 2/160; 15/443; 623/57, 65; 224/217–219; 401/6–8, 48

See application file for complete search history.

(56) References Cited

U.S. PATENT DOCUMENTS

| | | | | |
|---|---|---|---|---|
| 2,827,635 A * | 3/1958 | Rasmus | .............................. | 2/21 |
| 3,358,527 A * | 12/1967 | Lake et al. | .................. | 74/484 R |
| 4,157,616 A * | 6/1979 | Lundqvist | ....................... | 30/153 |
| 4,325,187 A * | 4/1982 | Wasson | ........................... | 30/327 |
| 4,447,912 A | 5/1984 | Morrow | | |
| 4,944,766 A | 7/1990 | Williams | | |
| 4,957,442 A * | 9/1990 | Prater | ........................... | 434/166 |
| 5,020,710 A * | 6/1991 | Meszaros | ...................... | 224/219 |
| 5,037,224 A | 8/1991 | Wright | | |
| 5,180,239 A | 1/1993 | Bistrack | | |
| 5,597,189 A | 1/1997 | Barbee, Sr. | | |

(Continued)

OTHER PUBLICATIONS

Writing Aids by Aha, "Able Home Aides Product List", retrieved from the Internet on Jun. 14, 2012: www.universale.com/writing_aids.htm (8 pages).

*Primary Examiner* — Stephen Vu

(74) *Attorney, Agent, or Firm* — McKee, Voorhees & Sease

(57) ABSTRACT

An adaptive device for aiding a person with a medical condition is provided. The adaptive device is attached to a hand or limb and includes a platform. A bumper is positioned on the platform to aid in the positioning and securing of the device. A holder extends from the platform, either perpendicularly or at an angle to the platform. The holder is configured to receive an item to aid the individual in everyday tasks. The device also includes securing members, which may be straps that are connected to the device to further aid in securing the device to the user. Additionally, the device may include cushions or other comfort members on the bumper, platform, and/or holder.

18 Claims, 8 Drawing Sheets

(56) References Cited

U.S. PATENT DOCUMENTS

| | | | | |
|---|---|---|---|---|
| 5,853,210 | A * | 12/1998 | Robinson | 294/25 |
| 5,894,971 | A * | 4/1999 | Huang | 224/218 |
| 6,238,358 | B1 | 5/2001 | Philot et al. | |
| 6,328,494 | B1 * | 12/2001 | Moxon | 401/8 |
| 6,854,913 | B2 | 2/2005 | Farrell et al. | |
| 7,438,726 | B2 | 10/2008 | Erb | |
| 2003/0033023 | A1 | 2/2003 | McCrae | |
| 2007/0197066 | A1 | 8/2007 | Chang | |
| 2008/0217507 | A1 * | 9/2008 | McKenzie et al. | 248/689 |
| 2010/0161078 | A1 | 6/2010 | Clark | |

* cited by examiner

TERMINAL END MOUNTED PROSTHETIC DEVICE

CROSS-REFERENCE TO RELATED APPLICATIONS

This application claims priority under 35 U.S.C. §119 of a provisional application Ser. No. 61/444,406 filed Feb. 18, 2011, which application is hereby incorporated by reference in its entirety.

FIELD OF THE INVENTION

The invention relates to a field, which comprises the art for a terminal end mounted prosthetic device for use by persons with a medical condition.

BACKGROUND OF THE INVENTION

Persons suffering from a medical condition such as an impaired hand, or lack thereof, as having occurred congenitally, accidentally or otherwise can be severely limited and may not be able to perform simple daily tasks easily done with a normal hand. Such persons may be unable to hold a writing implement, food item, kitchen utensil, toy, personal hygiene and grooming items or other similar devices due to the inability to secure the device and perform the intended function that the device usually serves. The person may have a strong, supportive upper limb, but the hand, or lack thereof, is unable to hold, grip, or stabilize items necessary to perform normal tasks associated with such devices. Writing implements, for example pencils, pens, markers, etc., cannot be grasped or held firmly enough, if at all, to complete the task.

Various prosthetics for persons with a medical condition having an impaired hand, or lack thereof, exist and are known to provide assistance to the person affected by the handicap. However, the devices do not provide a simple and inexpensive solution to aiding a person in doing normal tasks. For instance, many devices require that a rather large portion of the prosthetic be attached to the arm of an individual. The added material increases the cost of manufacturing, and thus, the price of the prosthetic. Other prosthetic devices are function-specific, in that tedious changes must be made to the device in order for the device to accomplish different functions.

It is therefore a principal object, feature, and/or advantage of the present invention to overcome deficiencies in the art.

It is another object, feature, and/or advantage of the present invention to provide a person with a medical condition affecting their upper limb the ability to perform necessary and/or everyday tasks.

It is another object, feature, and/or advantage of the present invention to provide a prosthetic device that grips, holds, stabilizes and/or secures an item.

It is yet another object, feature, and/or advantage of the present invention to provide a prosthetic device that is reliable, cost-effective, and comfortable.

These and/or other objects, features, and advantages of the present invention will be apparent to those skilled in the art. The present invention is not to be limited to or by these objects, features and advantages. No single embodiment need provide each and every object, feature, or advantage.

SUMMARY OF INVENTION

The present invention relates to a device for use by persons with a medical condition limiting the use of their hand or arm.

The invention relates, more specifically, to a device that can be attached to a terminal end of an arm or hand affected by said condition. The device enables the user to hold, grip, stabilize or secure an item they may not have otherwise been able to manipulate. The device is small, comfortable and minimally apparent to others.

The present invention is a prosthetic device that comprises a platform of lightweight, durable, yet firm material, such as moldable plastic. The device further comprises an adjacent bumper section of the same or similar lightweight material, such as moldable plastic. An elongated upright, nearly cylindrical section of the same or similar material is placed perpendicular or at an angle approximately 50-60 degrees in measurement to the platform and near the bumper. The aforementioned section may readily receive and release an item such as a writing implement, kitchen utensil, toy, food item, personal hygiene or grooming item, or the like. A comfort member comprising a soft cushioning material such as foam, moleskin, felt, gel cushion, or the like is located adjacent to the bumper; furthermore, it may be adjacent to the upright cylinder as well to enhance the comfort of the user. Securing members of adjustable, lightweight, durable material such as a plurality of strapping made of hook and loop fastener, elastic, leather, or neoprene are wrapped around the affected hand or terminal end of the user to secure in place. The securing members can be readily attached to the platform as by the use of a hook and loop fastener, buckle, buttons, snaps, or the like. Furthermore, these members may also be used to secure or stabilize an item such as those mentioned above placed between the platform and the inner aspect of the affected hand or arm of the user. The entire device can be worn in any setting and be minimally apparent to others.

A series of items including writing implements, food items, kitchen utensils, personal hygiene and grooming items, or the like can be attached by placing the item in the holder, or between the inner aspect of the affected hand or arm and the platform. Should the user of this device have a fully functioning other hand, the user can add or change the item contained in, or stabilized by the device by removal from the holder or from between platform and the hand.

The device can be utilized by almost anyone with a hand impairment of a developmentally mature age to accomplish a specific everyday task such as writing, coloring, eating, personal grooming, or playing. These tasks can be effected in a manner that allows the user to maximize the hand or lack thereof, to realize the desired goal in a way that is similar to that in which an unimpaired person would do.

DESCRIPTION OF THE PREFERRED EMBODIMENT

The descriptions that follow have been labeled with numbers, which remain the same throughout when referring to parts. The figures are not necessarily drawn to size or scale and the proportion may be distorted.

Figure 1:
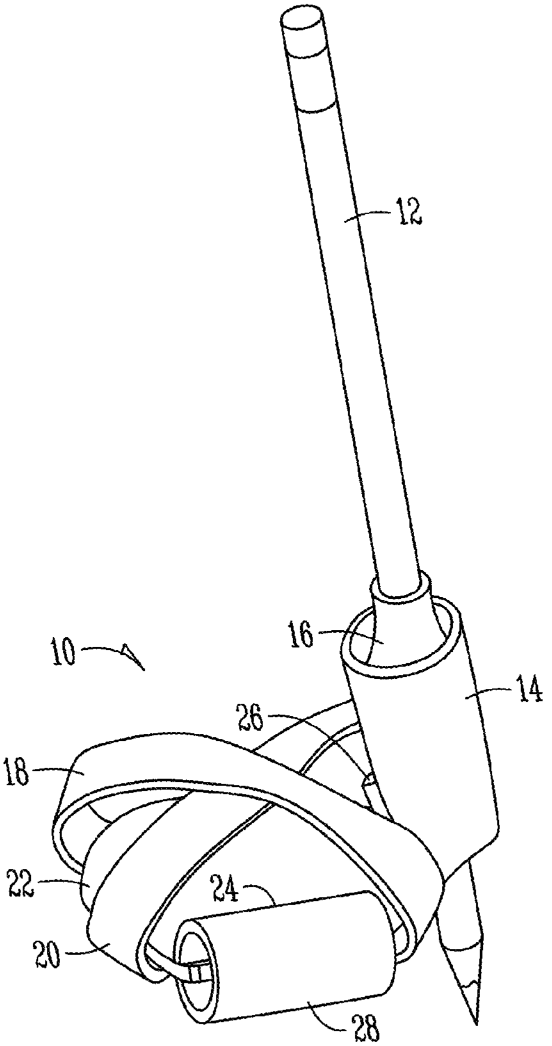
FIG. 1 is a perspective view of a prosthetic device according to the present invention.

Referring to FIG. 1, the numeral 10 generally designates a prosthetic device. The device 10 is shown with a writing implement 12, in this case a pencil, that includes an adjustable securing device 16 mounted in a holder 14. FIG. 1 also illustrates a plurality of securing members 18 and 20 to maintain contact and stability between the hand or terminal end of the user and platform 22 by crossing over the back of the hand or terminal end in a perpendicular fashion. The comfort member 24 is depicted in FIG. 1 as adjacent to the vertical bumper 28. The comfort member 24 is shown of similar length as the vertical bumper 28. FIG. 1 also includes a second comfort member 26 wrapping horizontally on the holder 14, shown here as partially encompassing the holder 14.

Figure 2:
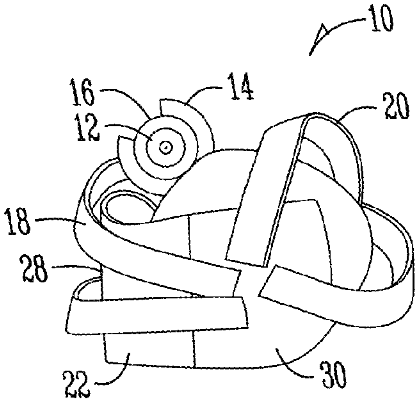
FIG. 2 is a bottom view of a prosthetic device of the present invention.

FIG. 2 illustrates the underside of device 10. In this figure, the writing implement 12 is shown surrounded by an adjustable securing device 16, which is in turn at least partially surrounded by holder 14. The writing implement 12, holder 14 and adjustable securing device 16 are shown attached to the platform 22. A plurality of securing members 18 and 20 made of loops are connected to the platform 22 by means of a securing device 30, in this case hooks from opposite sides.

Figure 3:
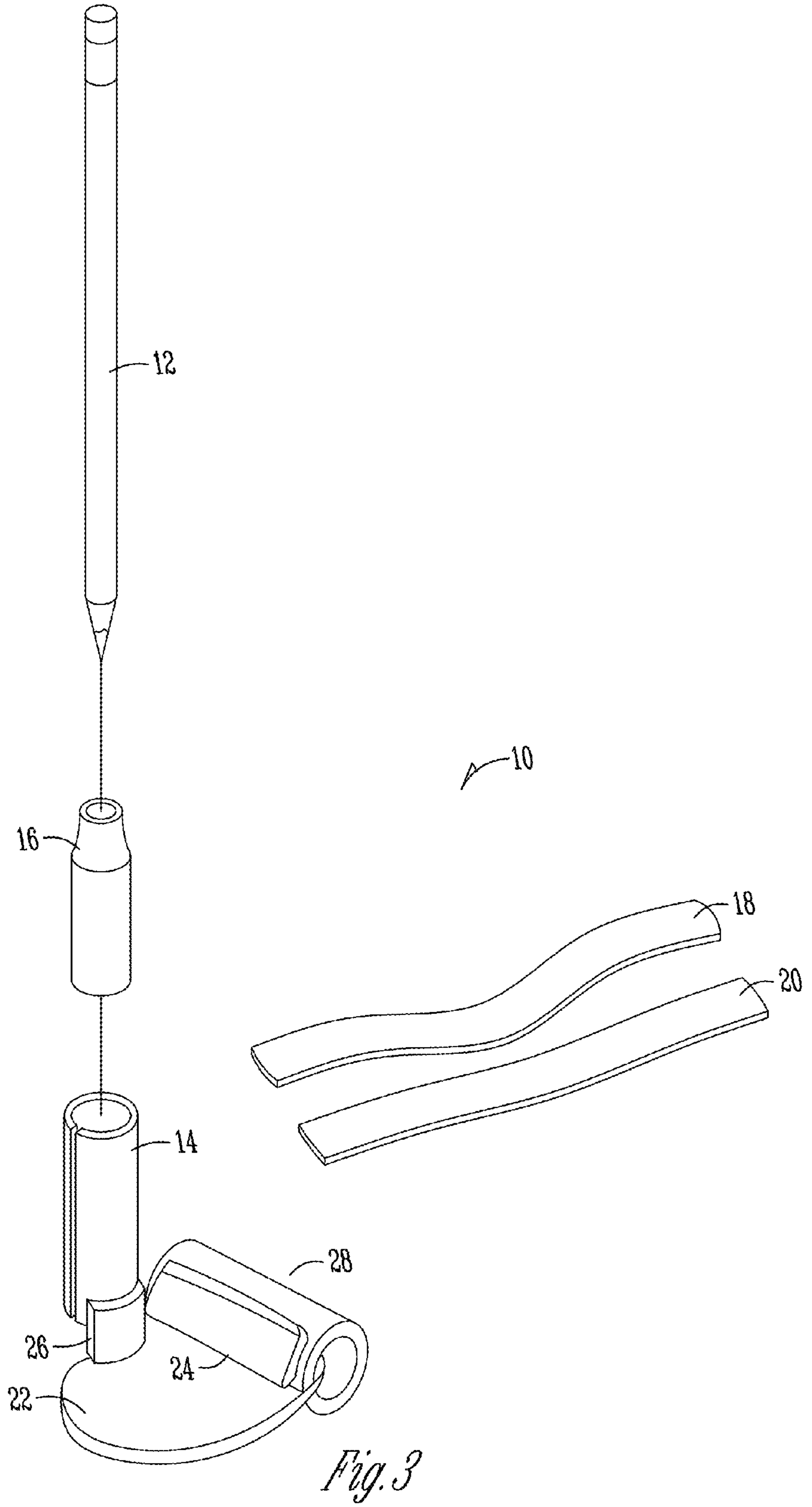
FIG. 3 is a view of the prosthetic device with a pencil attached and with holding straps undone.
Figure 4:
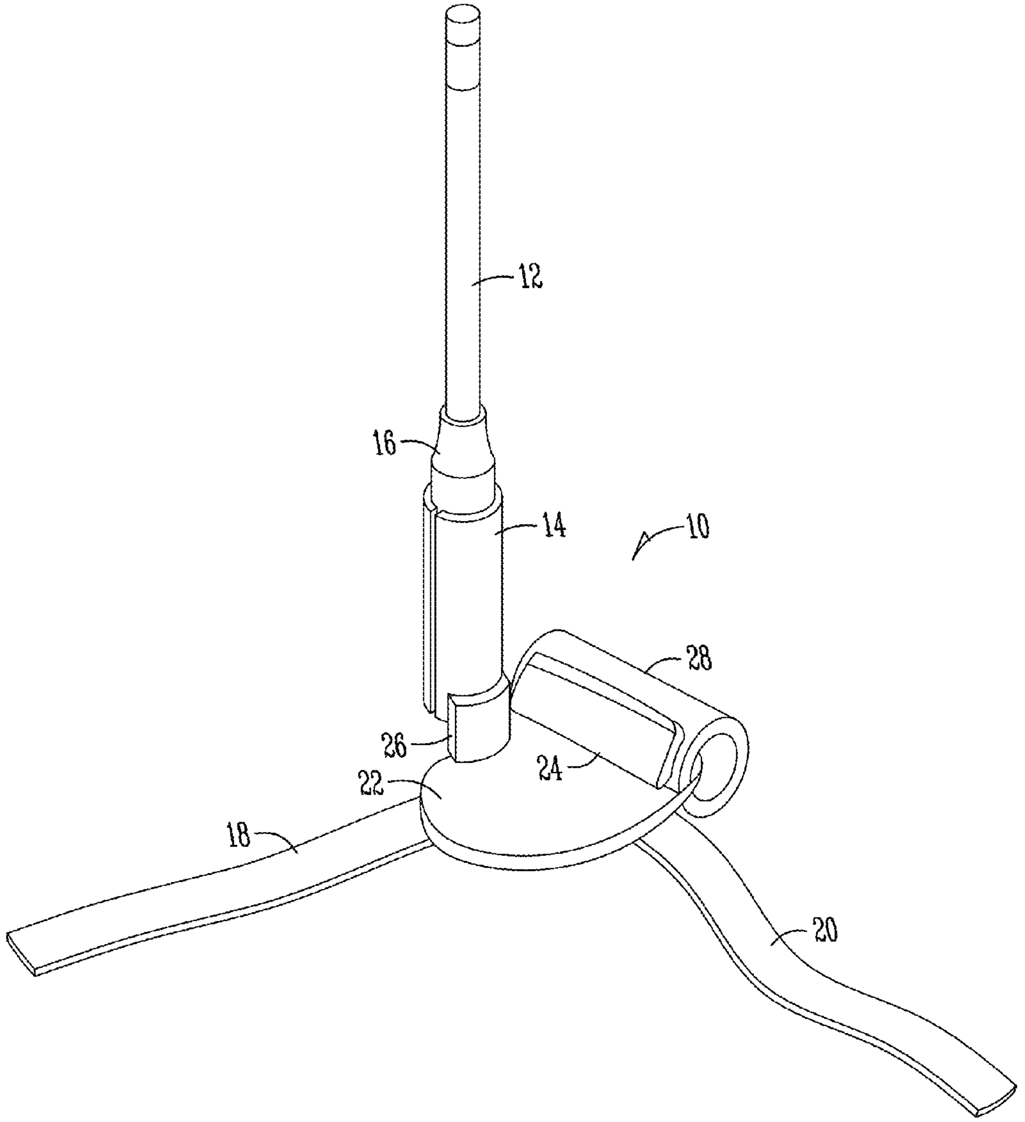
FIG. 4 is an exploded view of the components of the prosthetic device according to the present invention.

As is best shown in FIG. 3 and FIG. 4, the device 10 is comprised of a holder 14, formed from a flat rectangular section of lightweight materials such as EZE Form, available from Sammons Preston and Roylan, into a cylindrical, not quite connected fashion. The device 10 is further comprised of a platform 22 and bumper 28 made of like material. The platform 22 is an ovate section with an elongated edge, which is molded into an upright segment attaching to the holder 14 on the interior side opposite the open seam. The surface of the platform 22 is substantially planar in the figure. However, it should be appreciated that the surface may include ridges, curves, or other obtrusions to aid the platform in fitting to a hand. Furthermore, it is appreciated that generally any moldable plastic or other material may be used instead of EZE Form.

The bumper 28 is a flat, rectangular section of EZE Form molded at one end into a cylindrical shape, which is bonded to the upper surface of the platform 22 and continues to wrap around to the underside where it is further bonded to the platform 22. EZE Form is known to become malleable at approximately 150° F. allowing for formation of the holder 14, platform 22, and bumper 28. While EZE Form is available in a variety of thicknesses, the device 10 uses EZE Form of ⅛ inch thickness to provide the user with enough strength that the device 10 is durable, but is also thin enough so that is not cumbersome. Other thicknesses of EZE Form or like material may also be used to achieve similar effects. Located on the posterior surface of the bumper 28 is mounted a thin, rectangular section of comfort member 24, such as Hapla Fleecy Web, which is known to be a soft self-adhesive, open-celled foam padding with a thin felt surface. Similarly, a small, thin, rectangular shaped section of flexible liner, such as moleskin, a soft, woven material known to reduce friction, is mounted on the lower, outer lateral side of the holder 14. The comfort members 24, 26 are positioned to relieve discomfort and irritation and prevent shifting of the device 10. Moleskin and hapla fleecy web are known for a soft cushioning surface on one side and adhesive coating on the reverse. Secured to the underside of the platform 22 are a plurality of securing members 18 and 20 of the aforementioned loop material, which can be wrapped tautly crosswise around the hand or terminal end of the user (not shown) and attached on the opposite side to the hook material 30 adhered to the bottom of 22. Velcro® hook and loop fasteners are known for being lightweight, durable, adjustable and easy to use, unlike cement. Also depicted in FIGS. 3 and 4 are writing implements in the form of a pencil 12 and an adjustable tubular securing mechanism, such as a pencil gripper. A pencil gripper is known to hold an item like a pencil securely when the item is slightly smaller than the circumference of the gripper and pressure is then applied to the exterior surface creating an interior tension.

Figure 5:
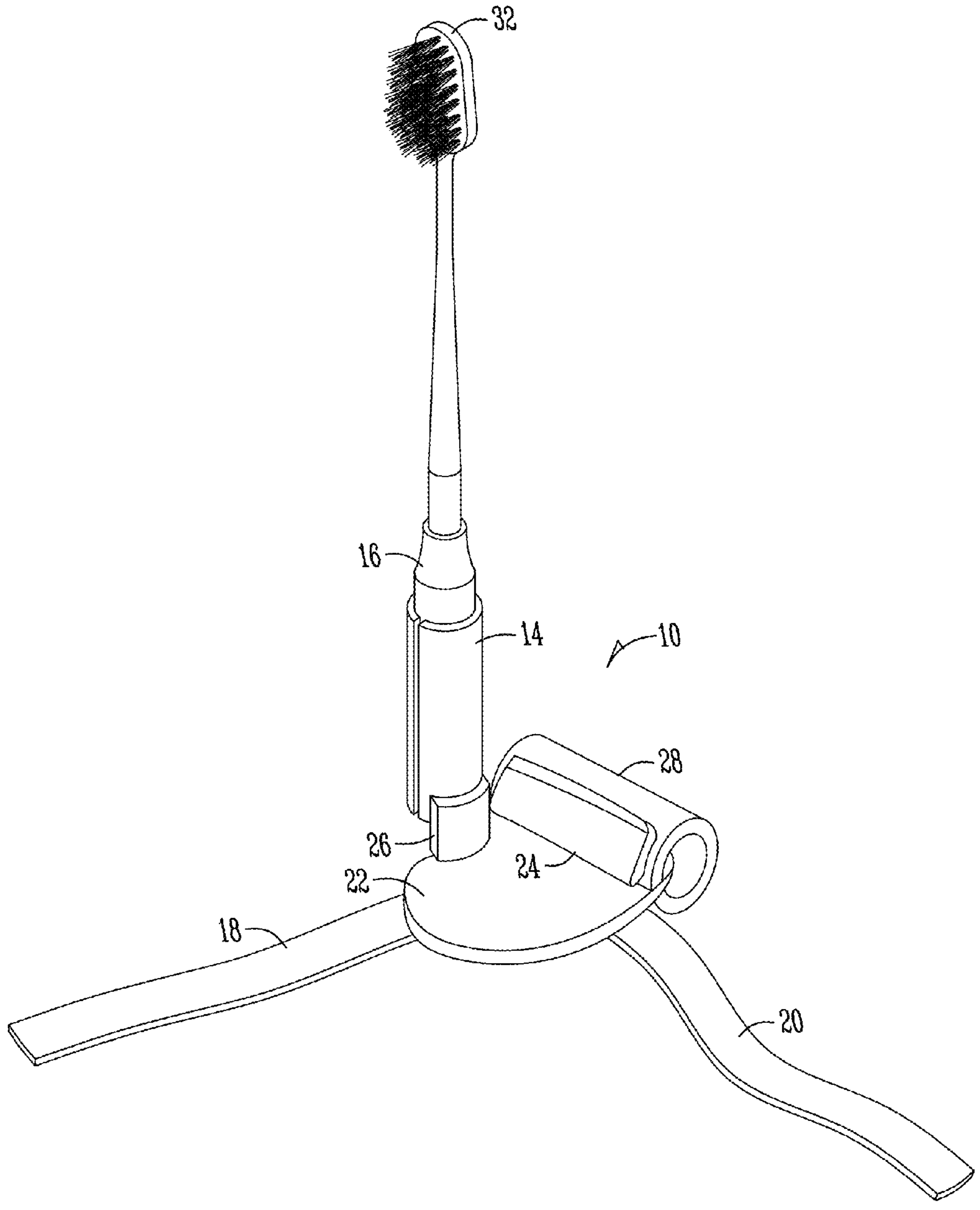
FIG. 5 is a view of the prosthetic device showing a toothbrush attached thereto.
Figure 6:
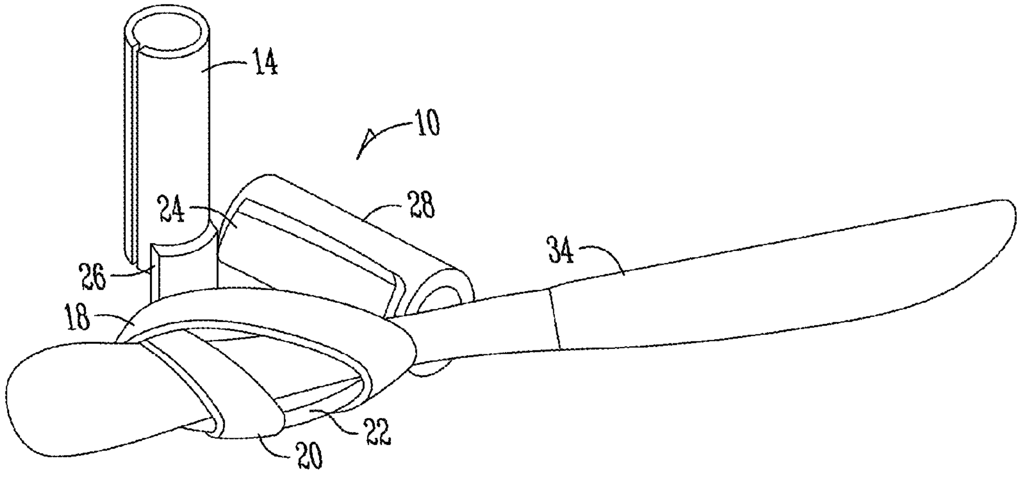
FIG. 6 is a view of the prosthetic device showing a knife attached thereto.

FIG. 5 illustrates a toothbrush 32 similarly joined to the device 10 while FIG. 6 does not use the holder 14. Rather, it utilizes pressure exerted by the platform 14 and the strappings 18 and 20 to secure an item such as the knife 34 depicted herein.

Figure 7:
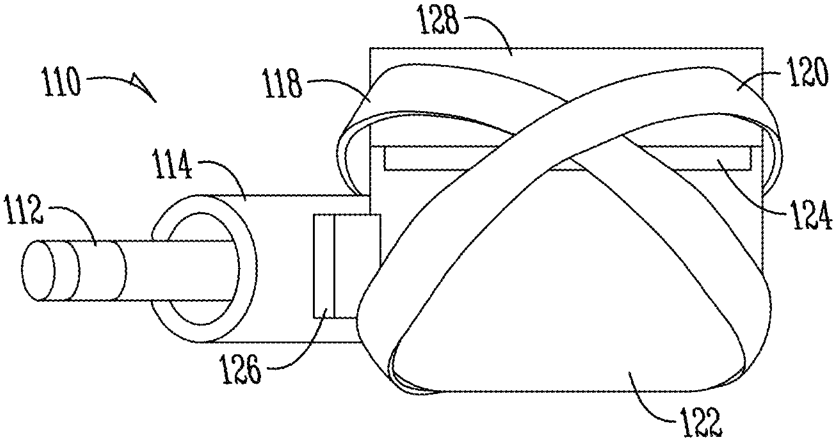
FIG. 7 is a plan view of an embodiment of the prosthetic device.

Referring to FIG. 7, the numeral 110 generally designates another embodiment of the prosthetic device. The device 110 is shown with a writing implement 112, in this case a pencil that includes an adjustable securing device 116 mounted in a holder 114. FIG. 7 also illustrates a plurality of strappings 118, 120 that secure the device 110 to the user's terminal end or hand by crossing diagonally over the backside of the terminal end or hand. The comfort member 126 is located on the lateral surface adjacent to the platform 122 on the holder 114 to prevent rubbing, chafing, and discomfort of the user. The comfort member 126 is generally located on the surface in contact with or adjacent to the platform 122. FIG. 7 includes a second comfort member 124 located on the bumper 128 and is generally of similar length as the bumper 128 and extends from platform 122 vertically following the surface of the bumper 128. Comfort members 124, 126 alleviate discomfort while affording the user the ability to be confident in the stability of the device. The bumper 128 in this embodiment is a continuation of the platform 122. The generally ovate, planar platform is elongated on one side and is then curved over and upward, forming a cylindrical shape that adheres to itself in order to create the bumper 128.

Figure 8:
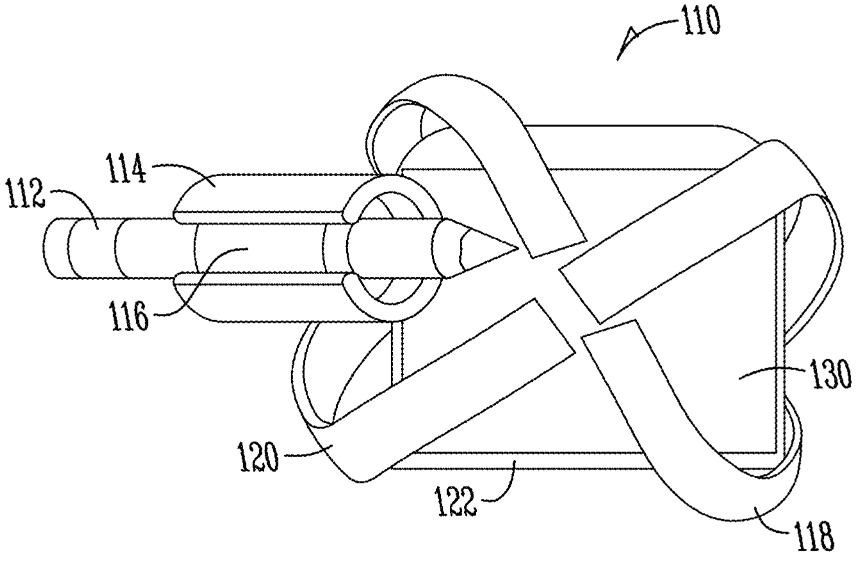
FIG. 8 is a bottom view of the prosthetic device of FIG. 7.

FIG. 8 illustrates the bottom side of the device 110. In this figure, a plurality of strappings 118, 120 are shown connected to the hook material 130 adhered to the underside of the platform 122. Velcro® hook and loop fasteners, such as those used in this embodiment, are known to be lightweight and durable, and provide the user the ability to easily adjust and secure device 110. The strappings 118, 120 are shown extending from the hook material, continue around the device 110 in a crisscrossing manner, and connect again to the hook material on the opposite corner.

Figure 9:
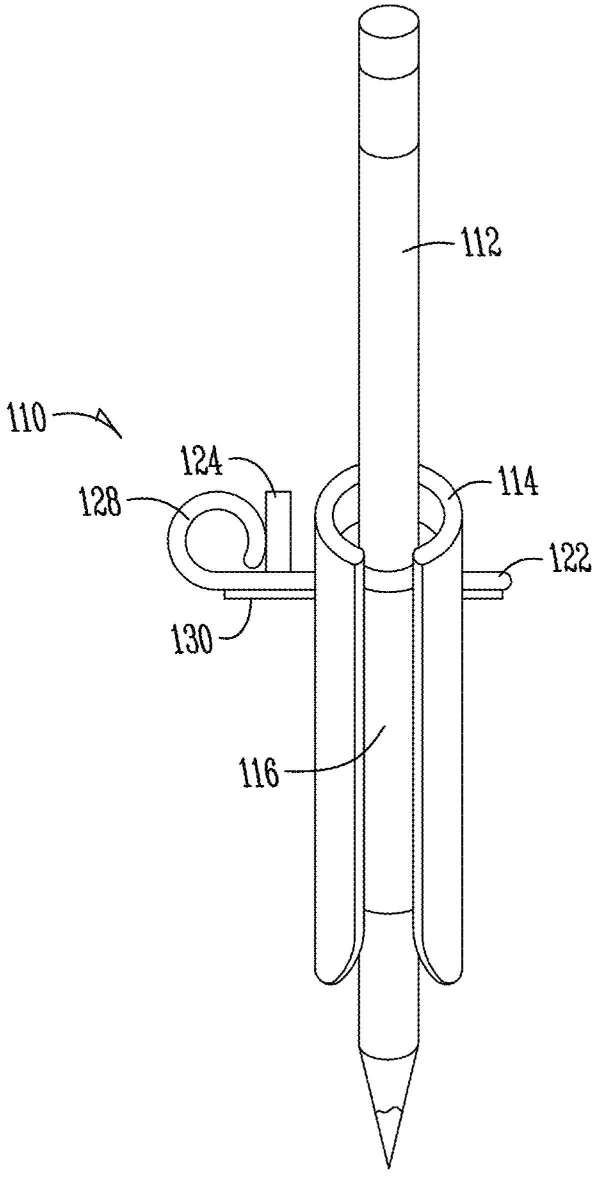
FIG. 9 is a side or lateral view of the prosthetic device of FIG. 7 with a writing utensil and securing member included.

As is best shown in FIG. 9, the holder 114 secures the item or utensil, in this case a pencil 112, ensconced in an adjustable securing device 116. The holder 114, while stabilizing the adjustable securing device 116, is not fully connected to itself on the vertical side allowing the user to remove or insert a variety of items, including but not limited to, writing utensils or personal grooming items. The holder 114 is attached to the platform 122 by means of the moldable plastic being secured as per manufacturer's directions, EZE Form being known to adhere to itself when heated and becomes malleable. From the platform 122, the section of EZE Form extends downward on the side adjacent to the bumper 128 and then curves back up to fold in on itself forming a single unit 1 known as the holder 114. The securing member 120 is shown connected to a hook fastener 132 adhered to the side of the holder 114, on a section of the moldable plastic extending generally downward from the platform 122. The securing member would wrap over the terminal end or hand of the user in a diagonal fashion and adhere to the hook material located on the bottom of the platform 122, as shown in FIG. 8. The bumper 128 is shown extending away from the holder 114 and the platform 122 is shown attached to the holder 114 at an angle.

Figure 10:
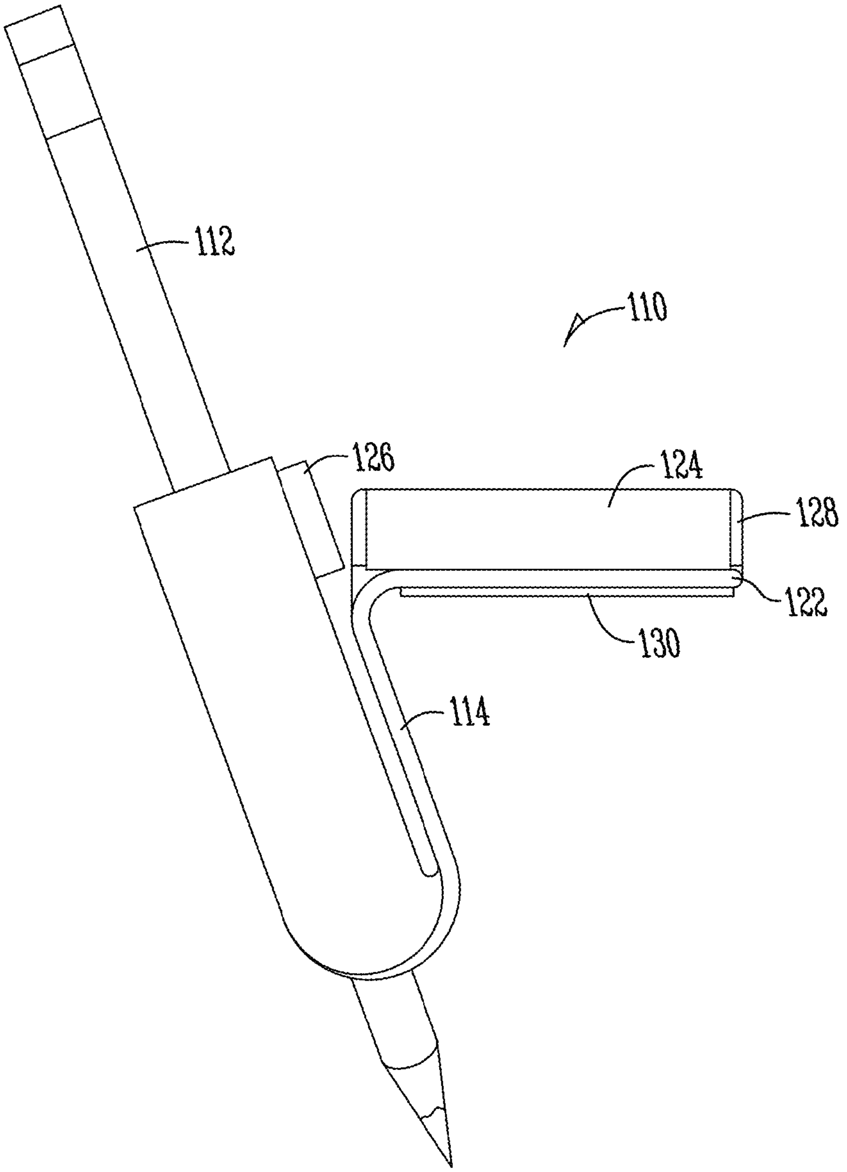
FIG. 10 is another side or lateral view of the prosthetic device of FIG. 7.

FIG. 10 depicts the device 110 from the rear side of the device. The holder 114 is adjacent to the platform 122, and extends above and below the surface of said platform 122. The extension allows the device 110 to incorporate an angle of approximately 50-60 degrees, measured from the platform 122 and the bottom surface of the platform 122. Preferably, the holder 114 extends at an angle between 45 and 90 degrees, and more preferably, the angle is between 50 and 60 degrees. The angle simulates the angle of the hand, wrist and arm in relation to the surface or imagined surface an implement may encounter, in this case the pencil 112 and paper writing surface. It has been found that this angle is more natural and ensures the comfort of the user for some tasks. However, it should be appreciated that the present invention contemplates that the holder 114 form an angle to the platform in a range from 30 degrees to 120 degrees. The exact angle may be determined on the individual and intended use of the device 110.

The comfort member 124 is adhered to the holder 114 on the lateral surface extending above the platform 122. The comfort member 126 is adhered to the bumper 128, which generally extends above the surface of the platform 122 and is located more or less perpendicular to the holder 114. Both the comfort member 126 and the bumper 128 generally equal the platform 122 in length. The plurality of straps 118, 120 are shown crossing over each other, allowing room for the user's terminal end or hand to be secured between them and the platform 122.

The above descriptions disclose a novel prosthetic device for use by individuals with an impaired hand or lack thereof. Because of the securing members 18, 20, the device 10 is easily mounted onto the affected hand or terminal end of the user. Once mounted, the device 10 remains securely in place. An implement, such as a pencil 12, and the adjustable securing mechanism 16 can be inserted easily into the holder 14 and set to the optimal height while maintaining its placement. With the item in place, the user is able to accomplish the desired everyday task, whether it is doodling, writing a letter to grandma, brushing teeth, etc. The device 110 affords the same advantages as the device 10, but also allows for the user to achieve a more natural angle for some tasks, such as writing.

The device 10 weighs a few grams, yet is durable and able to withstand many pounds of force produced by the user's thrust, lateral movement, circular motion, and rotation. The main part of the device 10, while worn by the user, is concealed by the palm or terminal end of the user, and the strappings 18, 20, holder 14, items 12, 32, 34 and bumper 28 remain visible. The device 10 allows the user to perform many functions, yet remains separate from the hand or terminal end of the user. The platform 22, bumper 28, and securing members 18, 20, when secured to the user, allow the transfer of horizontal, vertical, and circular movements to the item contained either within the holder 14 or between the platform 22 and the user's hand or terminal end. This enables the user to complete tasks such as, but not limited to, writing, eating, personal hygiene and grooming, or playing.

The device can be washed using a wet cloth and lukewarm soapy water and wiping thoroughly. The platform 22, holder 14, and bumper 28 can be cleaned in this manner. The moleskin, cushioning foam, and hook and loop fasteners can be easily replaced as needed with over-the-counter products readily available at discount stores, drug stores, or sewing and craft stores. The device 10 as described herewith does not require any specialty tools, only commercially available products such as EZE Form, a hot water bath to prepare the EZE Form per manufacturer's directions, cutting implements like scissors to cut to size, hook and loop strapping and fasteners like Velcro®, and adjustable securing mechanisms like pencil grippers, which are also easily acquired at discount stores, drug stores, and office supply stores.

Even though the focus has been primarily on writing implements, it is to be understood that the device 10 may be used with other items, including but not limited to, personal grooming and hygiene items like toothbrushes or combs, kitchen utensils, paintbrushes, markers, toys, food items such as cheese sticks, or candy canes with little modification, if any. Such modifications may comprise removal of adjustable securing mechanism or placement of item.

While the device 10 could be made in a wide variety of ways without losing the purpose or intent, these figures do not encompass all possible means and manners. The illustrations are meant to be an example, but not limit the diverse methods of manufacturing and usage. For example, it is understood that the size, shape, and material of the device may be varied according to the intended use and availability of supplies used to make the device. For instance, the securing members may use snaps or light adhesives to connect to one another and device instead of hook and loops. The shape of the holder may be varied to accommodate the insertion of a wider range of utensils. Furthermore, the device may be altered in order to allow for a greater variety of uses, and to accommodate a wider range of user size and abilities.

What is claimed is:

1. An adaptive device for aiding a person with a medical condition including an impaired hand or limb, comprising:

a. a platform comprising a lightweight material, the platform having substantially planar top and bottom surfaces;

b. a holder extending from the top surface of the platform;

c. a bumper extending from the platform adjacent to the holder, the bumper separate from the holder, the bumper including an arcuate portion and extending substantially the length of the platform; and d. a securing member operably attached to the bottom surface of the platform, the securing member including means for securing the member to the platform;

e. wherein the securing member is configured to secure a terminal end of the impaired hand or limb to the top surface of the platform such that the person, by moving the impaired hand or limb, operates an object positioned at least partially within the holder; and f. wherein the securing member comprises a plurality of straps, wherein the plurality of straps at least partially surround the terminal end of the impaired hand or limb to aid in holding the device in place relative to the hand or limb.

2. The device of claim 1 further comprising a comfort member positioned on the bumper, the comfort member comprising a pliable material.

3. The device of claim 2 further comprising a second comfort member adhered to an external portion of the holder and at least partially surrounding the holder.

4. The device of claim 1 further comprising an adjustable securing device to assist in holding an item in the holder.

5. The device of claim 1 further comprising an implement positioned in the holder.

6. The device of claim 5 wherein the implement is a pencil.

7. The device of claim 1 wherein the means for securing the member to the platform comprises hooks and loops attached at the bottom surface of the platform.

8. The device of claim 1 wherein the holder extends from the top surface of the platform both above and at least partially below the platform.

9. The device of claim 8 wherein the holder extends downwardly at an angle generally between 45 and 90 degrees relative to the platform.

10. The device of claim 9 wherein the holder extends downwardly at an angle between 50 and 60 degrees relative to the platform.

11. An adaptive device, comprising:

a platform comprising a substantially planar top and bottom and including a holder extending above and below the platform at a side of the platform, the holder comprising a cavity;

a bumper positioned on the platform and including an arcuate portion and extending substantially the length of the platform;

a securing device positioned within the cavity of the holder, the securing device adapted to receive and restrain an item; and at least one securing member operably connected to the platform, wherein the securing member is adjustable in size by adjusting the length of the securing member connected to the platform;

wherein the platform, holder, and bumper comprise a unitary member; and wherein the securing member is configured to secure a terminal end of an impaired hand or limb to the top of the platform such that a person, by moving the impaired hand or limb, operates an object positioned at least partially within the holder.

12. The device of claim 11 wherein the holder extends at an angle between 50 and 60 degrees relative to the bottom of the platform.

13. The device of claim 11 wherein the platform, holder, and bumper comprise a single piece of molded material, wherein the bumper comprises a curved portion of the substantially planar platform.

14. The device of claim 11 further comprising a first comfort member positioned at least partially on the bumper and a second comfort member positioned at least partially surrounding the holder, the comfort members comprising a pliable material.

15. The device of claim 11 wherein the cavity of the holder is sized to hold a variety of items.

16. The device of claim 15 further comprising a securing device positioned within the cavity of the holder.

17. The device of claim 11 wherein the at least one securing member comprises a strap that is selectively engageable to the platform.

18. An adaptive device, comprising:

a platform comprising a substantially planar top and bottom and including a holder extending above and below the platform at a side of the platform, the holder comprising a cavity;

a bumper positioned on the platform and including an arcuate portion and extending substantially the length of the platform;

a securing device positioned within the cavity of the holder, the securing device adapted to receive and restrain an item; and at least one securing member operably connected to the platform, wherein the securing member is adjustable;

wherein the platform, holder, and bumper comprise a unitary member; and wherein the adaptive device is configured such that in an operative position the impaired hand or limb is positioned on the top of the platform and secured to the platform with the at least one securing member.

* * * * *